United States Patent [19]

Namioka et al.

[11] Patent Number: 4,938,587
[45] Date of Patent: Jul. 3, 1990

[54] FOLDABLE OPTICAL APPARATUS

[75] Inventors: Kenta Namioka; Tokuji Sato; Minoru Shiiba, all of Tokyo; Fumio Kikutzugi; Hirofumi Kino, both of Osaka, all of Japan

[73] Assignees: Fuji Photo Film Co., Ltd., Kanagawa; Matsushita Electric Industrial Co., Ltd., Osaka, both of Japan

[21] Appl. No.: 352,542

[22] Filed: May 16, 1989

[30] Foreign Application Priority Data

May 16, 1988 [JP] Japan .............................. 63-64223[U]
May 16, 1988 [JP] Japan .............................. 63-64224[U]
May 16, 1988 [JP] Japan .............................. 63-64225[U]

[51] Int. Cl.$^5$ ............................................. G03B 21/00
[52] U.S. Cl. ....................................... 353/66; 353/119; 353/DIG. 4
[58] Field of Search ................... 353/DIG. 3, DIG. 4, 353/79, 119, 65–67, 72, 98, 99, 63, 64

[56] References Cited

U.S. PATENT DOCUMENTS

| | | | |
|---|---|---|---|
| 4,588,271 | 5/1986 | Emura | 353/66 |
| 4,696,557 | 9/1987 | Tomizuka | 353/66 |
| 4,776,688 | 10/1988 | Ushiro et al. | 353/66 |

FOREIGN PATENT DOCUMENTS 61-13843 1/1986 Japan.

Primary Examiner—Harry N. Haroian
Attorney, Agent, or Firm—Young & Thompson

[57] ABSTRACT

An optical apparatus having a base table on which an original is placed and an image forming unit with an optical system which projects an image of the original onto a remote screen for showing the same to a number of viewers. A foldable structure is provided, having a support structure mounted on a base table for movement between a lowered position covering the base table and a raised position wherein the image forming unit is located above the base table so as to form and project the image of the original onto the remote screen. A linkage interconnects the image forming unit and the support structure for causing a movement of the image forming unit relative to the support structure upon movement of the support structure between the folded and unfolded positions, thereby placing the image forming unit above the base table when the supporting means is in the raised position and flush with the support means so as to cover the base table when the support means is in the lowered position.

11 Claims, 5 Drawing Sheets

FOLDABLE OPTICAL APPARATUS

BACKGROUND OF THE INVENTION

The present invention relates to a foldable optical apparatus, and more particularly to an optical apparatus, such as a portable overhead projector or an image input apparatus, that has an image forming system foldable with respect to a table on which an original is placed.

Overhead projectors or image input apparatus are advantageously used to show viewers simultaneously a picture or notes on an original. Such an overhead projector projects an image of a transparent original onto a remote screen. A recent tendency in such instruments is to provide a head unit containing an image forming unit and a projection unit which is foldable with respect to a table on which an original is placed, for convenience of carrying and storage.

One such overhead projector is described in, for example, Japanese Unexam. Utility Model Publ. No. 61-13,843, having a cover structure with a head unit formed as an integral whole that is folded and unfolded with respect to a table on which an original is placed. When unfolded, the head unit is positioned above the table. The integral head unit is, on the one hand, advantageous since it is brought into a proper position above the table by opening and raising the cover structure but, on the other hand, requires the overhead projector to have a generally box-shaped body housing for receiving the head unit when the cover structure is closed. This makes it difficult to construct the overhead projector so as to be compact when folded.

Some overhead projectors are provided with a swingable head unit attached to a supporting structure which is folded and unfolded with respect to the table. The head unit is, after unfolding the supporting structure, swung so as to locate the projection lens system above the table. In such an overhead projector, it is necessary to incorporate a lock mechanism for locking or latching the supporting structure in the unfolded position before placing the projector lens system above the table. This leads to a troublesome unfolding operation.

To facilitate the unfolding operation, it was proposed to locate the head unit above the table responsive to the unfolding of the supporting structure. In this case, however, it is necessary to provide linkage between the supporting structure and the head unit, resulting in a complicated mechanism of the supporting structure. Such a supporting structure and its associated mechanism neither cover the surface of a box-shaped body housing nor are receivable in the body housing because of the limited available inner space of the body housing, containing as it does various elements or units such as a power supply unit. Accordingly, it is hard to construct such an overhead projector so as to be compact in size.

Since the head unit contains an image forming system such as a projection lens system or an image forming lens system, which is generally heavy in weight, the supporting structure should be assisted by means of a strong spring so as to be unfolded by exerting only a small force and to be refolded in a cushioned manner. The provision of such a spring needs a lock mechanism for keeping the supporting structure folded. The spring, however, gradually loses elasticity with age, and so it becomes difficult to keep the supporting structure unfolded when the lock mechanism is released, allowing the supporting structure to collapse.

OBJECTS OF THE INVENTION

It is, therefore, an object of the present invention to provide a foldable optical, apparatus which can be unfolded in a simple manner and has a folded configuration simple in shape and compact in size.

It is another object of the present invention to provide a foldable optical apparatus which can be folded without any impact on the optical system.

SUMMARY OF THE INVENTION

The above objects of the present invention are achieved by providing a foldable structure for an optical apparatus having a base table on which an original is placed and an image forming unit with an optical system which forms and projects an image of the original onto a predetermined remote screen for displaying the same to a number of viewers. In accordance with a preferred embodiment of the present invention, the foldable structure has support means mounted on the base table for pivotal movement between a folded position wherein it covers a surface of the base table and an unfolded position wherein the image forming unit is above the base table in a position to form and project an image of the original on the base table onto the remote screen. Linkage means is provided and interconnects the image forming unit and the support means for causing a pivotal movement of the image forming unit relative to the support means upon movement of the support means between the folded and unfolded positions to position the image forming unit above the base table when the support means is pivotally moved to the unfolded position, and on the other hand flush with the support means so as to cover the base table when the support means is pivotally moved to the folded position.

In accordance with another preferred embodiment of the present invention, the foldable structure is provided with latching means having one end engageable with the base table for maintaining the support means in the unfolded position, and urging means disposed between the support means and the latching means for holding the one end of the latching means against the base table with a restorative force. When the supporting means is pivotally moved to the folded position, the restorative force stored in the urging means is increased so as to force the supporting means toward the unfolded position.

In accordance with still another preferred embodiment of the present invention, the folding structure is further provided with forcing means disposed in association with either one of the base table and the supporting means for forcing the supporting means toward the unfolded position when the supporting means is folded, and locking means for maintaining the supporting means in the folded position.

BRIEF DESCRIPTION OF THE DRAWINGS

Other objects and features of the present invention will be apparent upon reading the following detailed description taken in conjunction with illustrative embodiments shown in the accompanying drawings in which.

DETAILED DESCRIPTION OF THE INVENTION

Figure 1:
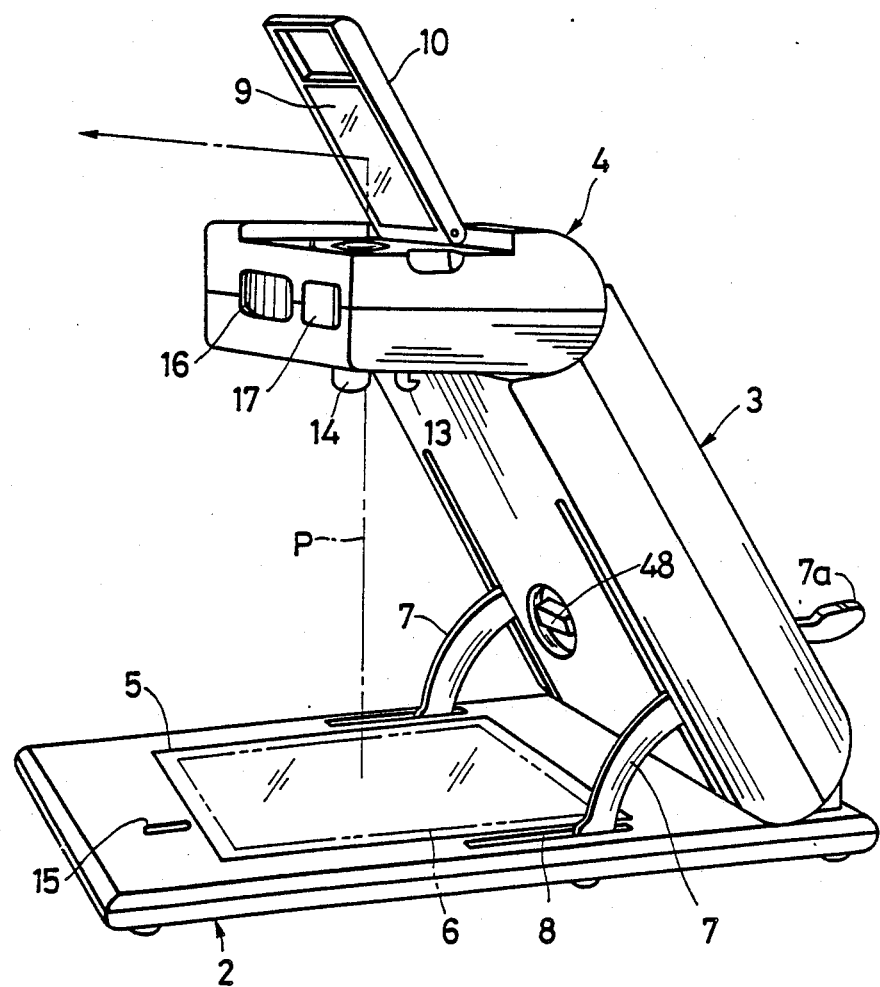
FIG. 1 is a perspective view showing an overhead projector in accordance with a preferred embodiment of the present invention which is unfolded in an in-use position.
Figure 2:
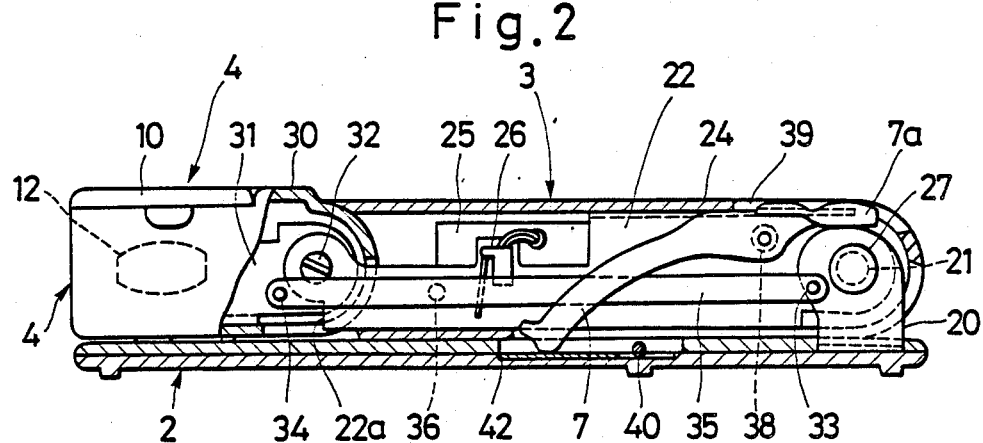
FIG. 2 is a side view, partly cut-away, showing the interior mechanism of the overhead projector shown in FIG. 1 in which the overhead projector is folded in a non-use position.
Figure 3:
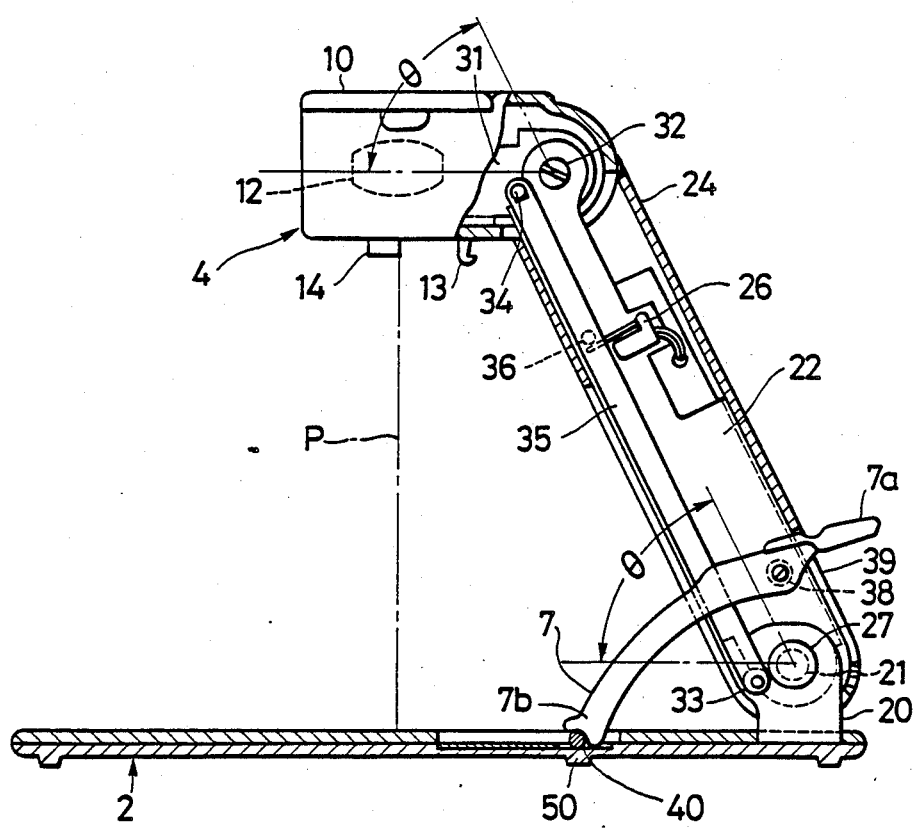
FIG. 3 is a side view, partly cut-away, showing the interior mechanism of the overhead projector shown in FIG. 1 in which the overhead projector is unfolded in the use position.

Referring to the drawings, in particular to FIGS. 1 to 3, an overhead projector with a foldable structure in accordance with a preferred embodiment of the present invention is shown, comprising a base unit 2, a support unit 3 pivotally mounted on the base unit for folding and unfolding movement, and a projection head unit 4 mounted on the free end of the support unit 3. The upper surface of the base unit 2 is provided with a Fresnel mirror 5 on which a transparent original 6 is placed for projection.

The support unit 3 is folded or collapsed into a non-use position wherein it covers the whole upper area of the base unit 2 and is unfolded or raised to the use position. To keep the support unit 3 in the use position, the support unit 3 is provided with a pair of lock levers 7 formed with latching ends 7b. When the support unit 3 is unfolded or raised to the use position, the lock levers 7 slide in grooves 8 formed in the base unit 2 on opposite sides of the Fresnel mirror 5 and the latching ends 7b engage with lock pins 40 in the grooves 8, so as to keep the support unit 3 firmly in the use position.

The projection head unit 4 is mounted on the free end of the support unit 3 for relative swinging movement. A mirror holder 10 with a reflecting mirror 9 is mounted on the projection head unit for rotation about the axis P of a projection lens system 12 and is also mounted on head 4 for relative vertical swinging movement. In addition to the projection lens system 12, a lamp is provided in the projection lens unit to illuminate the original 6 placed on the Fresnel mirror 5. A hook 13 is secured to the under surface of the projection head unit 4. The hook 13 engages with a lock pin 45 (see FIGS. 6 and 7) in a slot 15 of the base unit 2 when the support unit 3 is folded, so as to retain the projection head unit 4 and the support unit 3 in the non-use position. A spring-loaded cylindrical push-up rod 14 extends downward from within the projection head unit 4. The projection unit 4 is further provided with a dial knob 16 to focus the projection lens system 12 and a release button 17 for releasing the hook 13 from the lock pin 45.

The internal structure of the overhead projector in the folded or non-use position is shown in detail in FIG. 2. As shown, a pair of brackets 20 (one of which is hidden) is firmly secured to the upper surface of the base unit at the rear end and rotatably supports a hinge shaft 21 to which a chassis 22 is rigidly or firmly secured. The chassis 22 supports a support unit housing 24 for enclosing the support unit 3, and also supports a power supply unit 25 including a power transformer and power control circuit and a power switch 26 in the support unit housing 24. Between the bracket 20 and the chassis 22 a corrugated washer 46 is provided to impose a certain frictional drag on the chassis when it is swung vertically. The placement of the power supply unit 25 within the support unit 3 contributes to lessening the weight of the projection head unit and permits making the base unit 2 as a plate. A torsion spring 27 surrounds the shaft 21 and acts between the bracket 20 and the chassis 22 so as strongly to urge the chassis 22 in a direction in which the support unit 3 is unfolded or raised (which is referred hereinafter to as a clockwise direction).

The free end of the chassis 22 pivotally supports a shaft 32 to which is secured a chassis 31 enclosed in a housing 30 of the projection head unit 4. A link lever 35 is pivoted on pins 33 and 34 mounted on the bracket 20 and the chassis 31 of the projection head unit 4, respectively. The link lever 35 is parallel to a line connecting the centers of the shafts 21 and 32 and forms a parallelogram linkage 21-32-34-33. The link lever 35 is provided with a pin 36. When the support unit 3 is raised, the link lever 35 moves the pin 36 to turn on the power switch 26, such as a micro-switch. Power is supplied through a cable (not shown) connected to a commercial power source.

The lock lever 7 pivotally mounted on a pin 38 on the chassis 22 has an integral handle 7a. The handle 7a is received within a slot 39 formed in one side of the support unit housing 24 when the support unit 3 is folded. In the groove 8, a metal plate 42 is provided to facilitate sliding of the latching end 7b of the lock lever 7 when the support unit 3 is raised.

Figure 4:
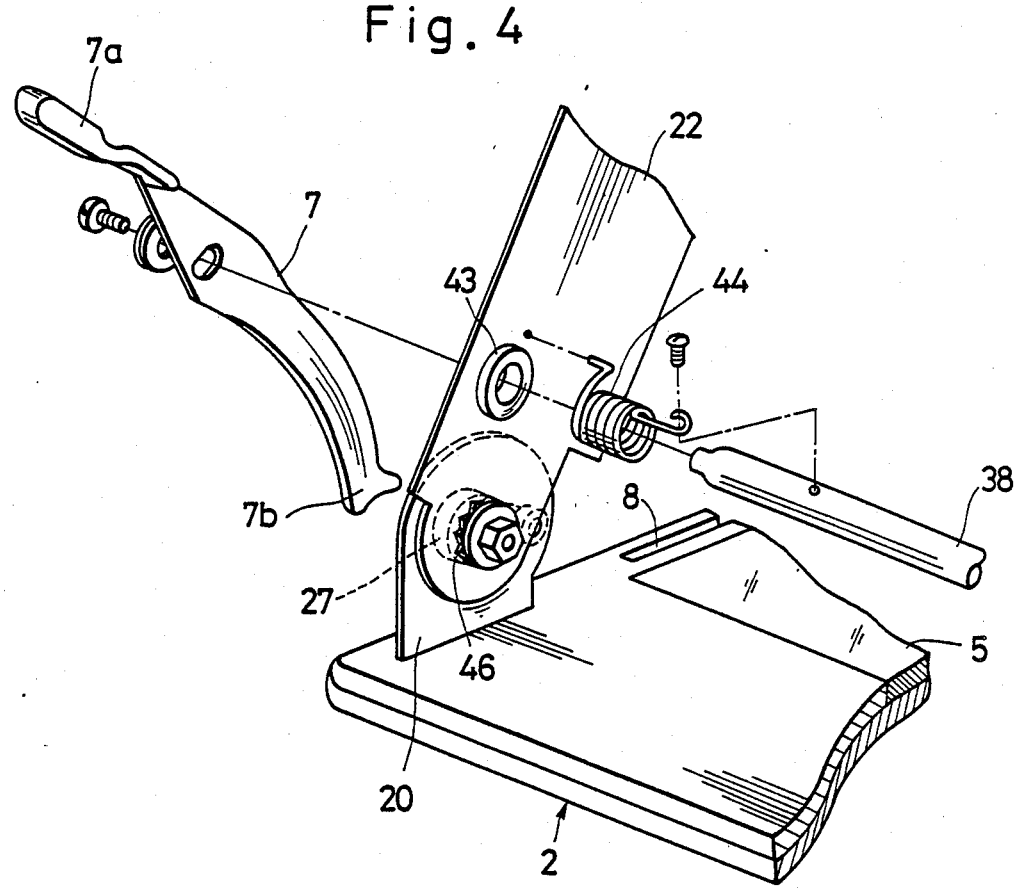
FIG. 4 is a fragmentary exploded perspective view showing an urging mechanism for the support structure.

Referring to FIG. 4 showing in detail the structure mounting the lock lever 7, the lock lever 7 is firmly secured to the shaft 38 supported for rotation by a bearing member 43 secured to the chassis 22. A coil spring 44 is mounted on the shaft 38 and fitted at one end into a hole in the chassis 22 and at the other end secured to the shaft 38 by means of a set screw. The coil spring 44 urges the shaft 38, and hence the lock lever 7, in the counterclockwise direction as seen in FIGS. 2 and 3, so as to maintain the latching end 7b of the lock lever 7 in contact with the metal plate 42, thus urging the support unit housing 24 to rise. When the support unit 3, and hence the chassis 22, rises, the coil spring 44 is torsioned to charge itself. The other lock lever 7 (not shown) is identical in structure and operation to the lock lever 7 described above except for the lack of a handle such as 7a and therefore need not be explained herein.

Figure 5:
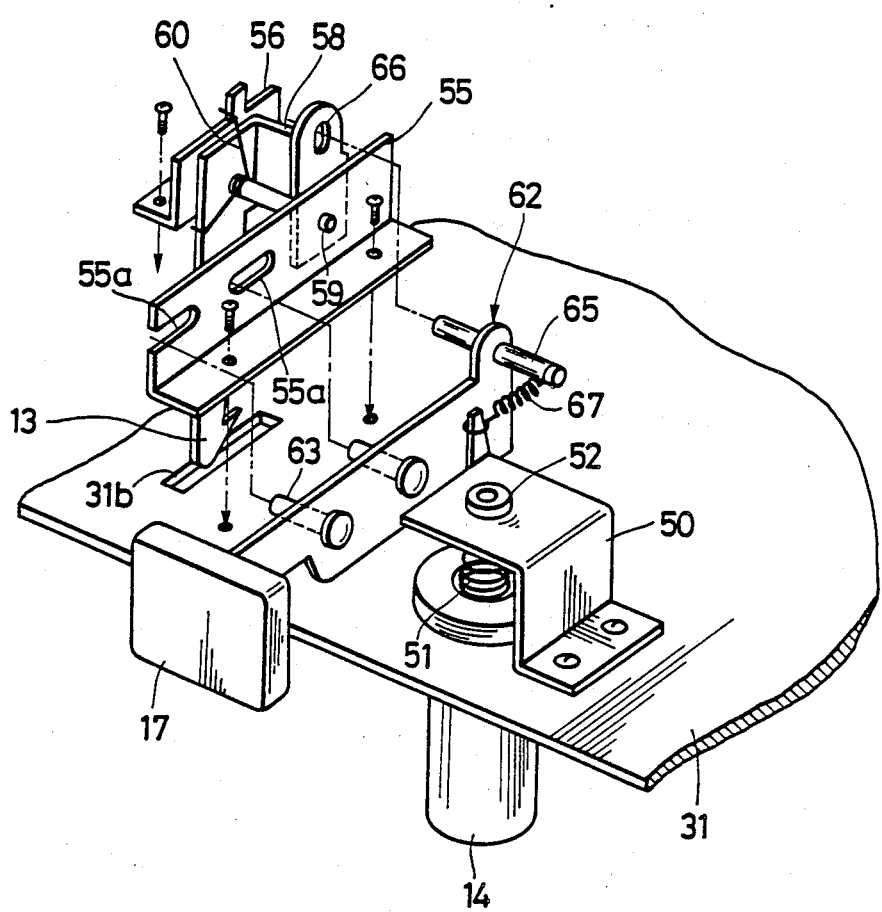
FIG. 5 is an exploded perspective view showing an interior mechanism of the projection head unit.
Figure 6:
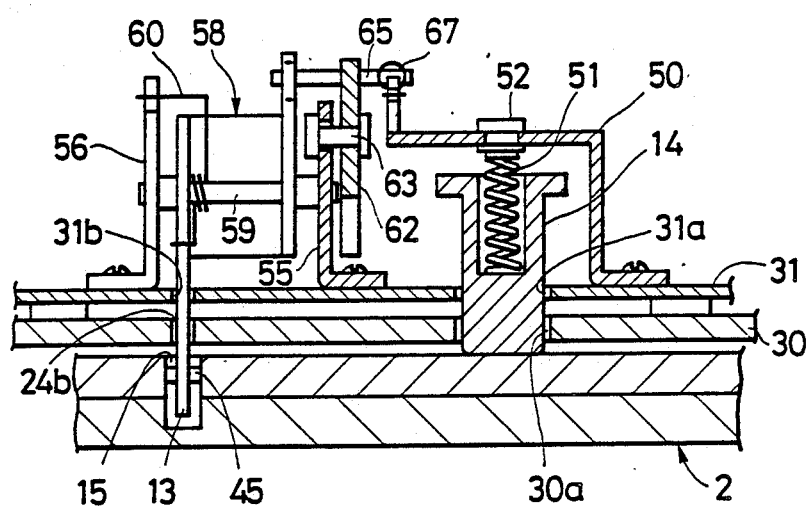
FIG. 6 is a sectional view of the interior mechanism of the projection head unit shown in FIG. 5 in which the projection head unit is locked in the folded position.
Figure 7:
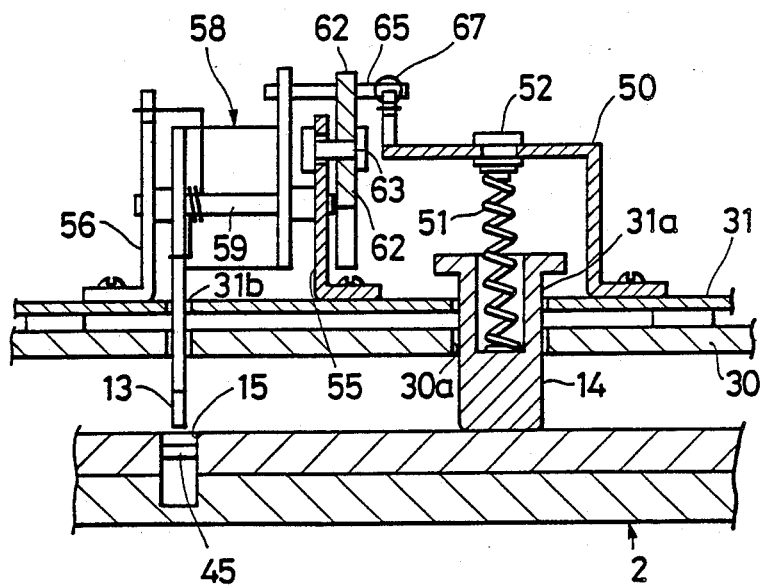
FIG. 7 is a sectional view of the interior mechanism of the projection head unit shown in FIG. 5 in which the projection head unit is unlocked.

Referring to FIGS. 5 to 7 showing the interior mechanism for locking and unlocking the hook 13 of the projection head unit 4, the projection head unit housing 30 includes a generally L-shaped bracket 50 secured to the chassis 31 with screws. The L-shaped bracket 50 has a boss 52 for retaining one end of a strong coil compression spring 51 which forces the push-up rod 14 downward to protrude through openings 30a and 31a formed in the projection head unit housing 30 and the chassis 31, respectively, and which thus functions as a damper.

An arm 58, which is integral with the hook 13 at the upper end of hook 13, is mounted on a mounting structure consisting of L-channel brackets 55 and 56 secured to the chassis 31 with screws. The hooked arm 58 is pivotally mounted on a shaft 59 supported by the L- shaped brackets 5 and 56. A coil torsion spring 60 surrounding shaft 59 acts between the hooked arm 58 and the L-shaped bracket 56 so as to urge the hooked arm 58 in the counterclockwise direction as seen in FIG. 5. The lower portion of arm 58 comprising the hook 13 protrudes below the projection head unit housing 30 through a slot 31b formed in the chassis 31.

The release button 17 is secured to one end of a release lever 62. The release lever 62 is provided with pins 63 which are slidably received in horizontal guide slots 55a formed in the L-shaped bracket 55 so as to guide the movement of the release lever 62 in the lengthwise direction of the lever. The movement of the release lever 62 is limited by the length of the closed-ended guide slots 55a so as to define the extreme positions of the hook 13. The release lever 62 has a pin 65 at the rear end. One end of the pin 65 is received in a vertical slot 66 formed in an upward projection of the hooked arm 58. The other end of the pin 65 is connected to the L-shaped bracket 50 by way of a coil tension spring 67, thereby urging the release lever 62 outwardly, which is to say toward the lower left in FIG. 5. When the release lever 62 is pushed in against the action of the spring 67, it forces the hooked arm 58 in the clockwise direction as seen in FIG. 5 against the action of spring 60.

When unfolding the overhead projector from the non-use position shown in FIG. 2, the release button 17 is pushed. This causes the inward movement of the release lever 62, turning the hooked arm 58 via the pin 65 in the clockwise direction, thereby releasing the hook 13 from engagement with the lock pin 45 in the slot 15 so as to unlock the projection head unit housing 30. This allows the coil compression spring 51 attached to the bracket 50 to expand so as to push the chassis 31 upwardly through the push-up rod 14, thus forcing the projection head unit housing 30 to rise slightly, as shown in FIG. 7, so that a space is provided between the base unit 2 and the support unit 3.

Although the chassis 22 of the supporting structure unit 3 urged by means of the spring 27 tends to rise, nevertheless, it is prevented from rising by the weight of the projection head unit 4 which contains the projection lens system 10 and an illumination lamp and associated elements. Instead, the support unit 3 is raised manually with a finger or fingers inserted into the space shown between 2 and 30 in FIG. 7. During rising of the support unit 3, the link lever 35 interconnecting the bracket 20 and the chassis 31 in the projection head unit housing 30 causes the projection head unit housing 30 to incline at the same angle with respect to the supporting unit housing 24 as an angle θ which the supporting unit housing 24 forms with the base unit 2. The head unit housing 30 is thus kept in parallel to the surface of the base unit 2 over the whole range of movement of the support unit 3.

When the support unit housing 24 has risen beyond use position wherein it will be maintained during use, the latching end 7b of the lock lever 7 rides over the lock pin 40 and falls on the other side of the lock pin 40. At this time, the latching end 7b strikes the metal plate 42 in the bottom of the groove 8, thus producing a sound indicating that the supporting unit housing 24 has been sufficiently raised. Upon removing the fingers from the support unit housing 24, the support unit housing 24 moves down until the latching end 7b of the lock lever 7 abuts the lock pin 40. Thus, the supporting unit housing 24 is brought into the use position, in which the projection head unit 30 is supported and maintained parallel to the surface of the base unit 2, as shown in FIG. 3. To support more firmly the projection head housing 30, the pin 34 connecting the link lever 35 to the chassis 31 of the projection head unit 4 is received by a shoulder 22a formed at the free end of the chassis 22 of the support unit 3. As was previously described, at the end of the rising movement of the support unit housing 24, the power switch 26 is turned on by the pin 36.

The support unit housing 24 thus unfolded brings the optical axis P of the projection lens system 23 into alignment with the center of the Fresnel mirror 5. To project an image, the mirror holder 10 is raised until it forms an angle of 45° with the optical axis P. To project an image in a desired direction, the mirror holder is turned about the optical axis P, thus completing the adjustment of the overhead projector 1.

After placing the transparent original 6 on the Fresnel mirror 5, a lamp switch 48 incorporated in the support unit 3 is turned on to energize the illumination lamp. Light emanating from the lamp is reflected by the Fresnel mirror 5 and illuminates the transparent original 6 from the back. The light passing through the transparent original 6 is focused on a remote screen by means of the projection lens system 12 and the mirror 9, thus projecting an image of the transparent original 6 onto the remote screen. Because of pads 50 attached to the under surface of the base unit 2 directly below the lock pins 40 as well as in the respective corners, although the supporting unit housing 24 imposes a heavy load on the lock pin 40 through the lock lever 7, the base unit 2 is prevented from being deformed.

To fold the overhead projector 1, the handle 7a of the lock lever 7 is pushed down to turn the lock lever in the clockwise direction against force of the coil spring 44, causing the latching end 7b to disengage from the lock pin 40. The supporting unit housing 24 supporting the projection head unit 4 will then swing down by itself toward the base unit 2. As soon as the supporting unit housing 24 starts falling, the power switch 26 is turned off to cut the power, so that all electric elements including the illumination lamp are deenergized even though the lamp switch 48 has not been turned off.

As the supporting unit housing 24 falls, the spring 27, which urges the supporting unit housing 24 in the opposite direction, is charged, and the lock lever 7 secured to the shaft 38 turns relative to the chassis 22 of the supporting structure unit 3 to charge also the coil spring 44. The closer to the base unit 2 the supporting unit housing 24 falls, the greater the force with which each spring 27, 44 is charged. Accordingly, the supporting unit housing 24 will fall gently. Furthermore, because of the spring-loaded pushup rod 14 protruding from the head unit housing 30 and functioning as a damper, the head unit 4 is prevented from striking the base unit 2, thus preventing the projection lens system 12 and the illumination lamp from receiving an impact shock.

In this way, the support unit housing 24 is folded, leaving only a relatively small space between the base unit 2 and itself. This space is maintained by means of the spring-loaded push-up rod 14, which thus supports the remaining weight of the support unit 3 and the projection head unit 4. By then manually pushing down the projection head housing 30 against the action of the damper spring 44, the hook 13 is deflected by the lock pin 45 and turned in the clockwise direction against the force of spring 60. Upon releasing this manually applied downward force from the projection head housing 30, the spring 40 forces the hook lever 589 to turn back in the counterclockwise direction and the damper spring 51 expands and pushes the projection head housing 30 upward, thus bringing the hook 13 into releasable locking engagement with the lock pin 45 so as to hold the support unit housing 24 and the projection head housing 30 in folded position close to the base unit 2. The supporting unit and projection head housings 24 and 30 then completely cover and protect the Fresnel mirror 5, and the projection head housing 30 so locates the projection lens system 12 that it is not exposed to the outside. This folded structure prevents the optical elements, i.e. the projection lens system 12 and the Fresnel mirror 6 from being dirtied or scratched or damaged, when carrying or storing the overhead projector Since the handle 7a of the lock lever 7 is received inside the support unit housing 24, the overhead projector 1 thus folded has a thin and flat box-like configuration.

The linkage means connects the image forming unit to the support unit so as to maintain the image forming unit parallel to the surface of the base table while the support means is folded or unfolded. Therefore, it is not necessary to adjust the image forming unit relative to the support unit for placing it in its use position. Furthermore, the image forming unit is automatically brought into a position covering the stage when the support unit is folded so as to cover the stage. Owing to the folding structure, the folded optical apparatus has a thin and flat folded configuration.

Furthermore, because the urging means is disposed between the support means and the latching means for holding the one end of the latching means against the base table and the urging means increasingly stores restorative force therein while the support means is pivotally moved to the folded position, upon unlocking the image forming unit, the support structure can be quickly and easily raised to the unfolded position and maintained in the unfolded position without any additional operation. The urging means serves to avoid impact against the image forming unit, in particular the image forming optical system which is sensitive to shock and vibration, upon folding the apparatus.

Although the present invention has been fully described by way of the preferred embodiment thereof with reference to the accompanying drawings, it is to be noted that various changes and modifications will be apparent to those skilled in the art. Therefore, unless otherwise these changes and modifications depart from the scope of the present invention, they should be construed as included therein.

What is claimed is:

1. A foldable optical apparatus comprising:
    a base table having, a stage to bear thereon an original;
    support means comprising at least a power supply unit and mounted on said base table for vertical swinging movement between a lowered position covering said stage and a raised position;
    an image forming unit including at least an image forming optical system, and pivotally mounted on said support means for forming an image in a predetermined plane of an original disposed on said stage; and
    linkage means interconnecting said image forming unit and said support means for causing a pivotal movement of said image forming unit relative to said support unit upon movement of said support means between said raised and lowered positions, thereby positioning said image forming unit above said stage when said support means is in said raised position and flush with said supporting means and covering a portion of said stage when said support means is in said lowered position.

2. A foldable optical apparatus as defined in claim 1, wherein said linkage means is a parallelogram linkage which causes movement of said image forming unit in parallelism to itself upon pivotal movement of said support means between said raised and lowered positions.

3. A foldable optical apparatus as defined in claim 2, wherein said linkage includes a link lever pivotally mounted at one end of said base table and at its opposite end on said image forming unit.

4. A foldable optical apparatus comprising:
    a base table having a stage to bear thereon an original;
    support means pivotally supporting an image forming unit for forming an image in a predetermined plane of an original disposed on said stage, said support means being mounted on said base table for vertical swinging movement between a lowered position covering said stage and a raised position wherein said image forming unit is above said stage;
    latching means having a portion engageable with said base table for maintaining said support means in said raised position; and
    urging means disposed between said support means and said latching means for holding said portion of said latching means against said base table with a force tending to raise said support means, said force being increasingly stored in said urging means upon pivotal movement of said support means toward said lowered position.

5. A foldable optical apparatus as defined in claim 4, further comprising linkage means interconnecting said image forming unit and said support means for causing a pivotal movement of said image forming unit relative to said support unit upon pivotal movement of said support means between said raised and lowered positions, thereby placing said image forming unit above said stage when said support means is in said raised position and flush with said support means so as to cover said stage when said support means is in said lowered position.

6. A foldable optical apparatus as defined in claim 5, wherein said linkage means is a parallelogram linkage which causes movement of said image forming unit in parallelism to itself upon movement of said support means between said raised and lowered positions.

7. A foldable optical apparatus as defined in claim 6, wherein said linkage includes a link lever pivotally mounted at one end on said base table and at its opposite end on said image forming unit.

8. A foldable optical apparatus as defined in claim 4, wherein said latching means comprises a lever pivotally mounted on said support means and a spring interposed between said lever and said support means.

9. A foldable optical apparatus comprising:
    a base table having a stage to bear thereon an original;
    support means supporting at least an image forming optical system and mounted on said base table for vertical swinging movement between a lowered position covering said stage and a raised position wherein said image forming optical system is above said stage so as to form an image of an original placed on said stage in a predetermined plane;
    forcing means disposed in association with one of said base table and said supporting means for forcing said support means toward said unfolded position when said support means is folded; and locking means for maintaining said support means in said lowered position.

10. A foldable optical apparatus as defined in claim 9, wherein said image forming optical unit is housed in an image forming unit housing and said forcing means comprises a member supported for slidable movement by said image forming unit housing, and spring means urging said member partially out of said image forming unit housing against said base table so as to thrust said support means toward said raised position when said support means is lowered.

11. A foldable optical apparatus as defined in claim 9, wherein said support means comprises a support structure mounted on said base table for vertical swinging movement between said raised and lowered positions, an image forming unit housing containing said image forming optical system and mounted on said support means for pivotal movement relative to said support means, and linkage means interconnecting said image forming unit housing and said support means for causing a pivotal movement of said image forming unit housing relative to said supporting structure responsive to movement of said supporting structure between said raised and lowered positions, thereby positioning said image forming unit housing above said stage when said support structure is pivotally moved to said raised position and flush with said support structure so as to cover said stage when said support structure is pivotally moved to said lowered position.

* * * * *